Sept. 18, 1934.         J. G. KUBELUS              1,974,030
                      VALVE ACTUATING UNIT
              Filed Sept. 27, 1933      2 Sheets-Sheet 1
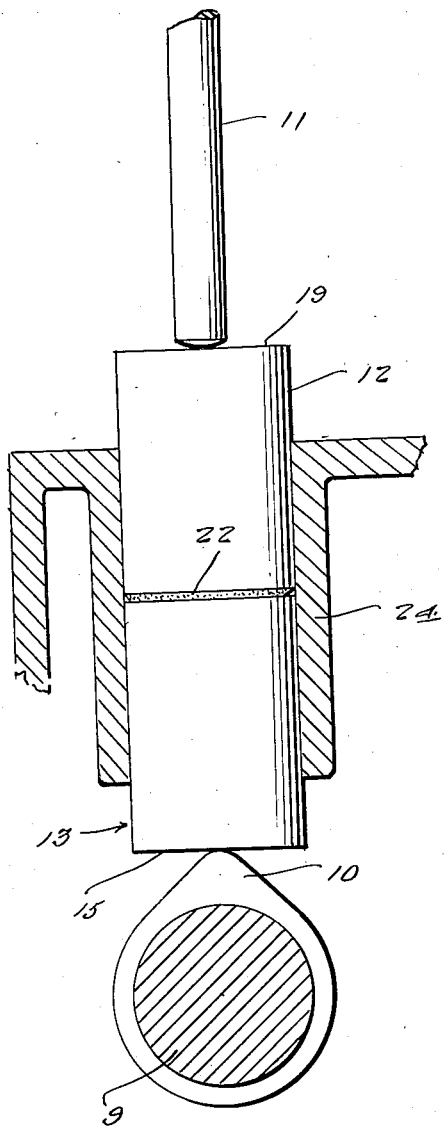
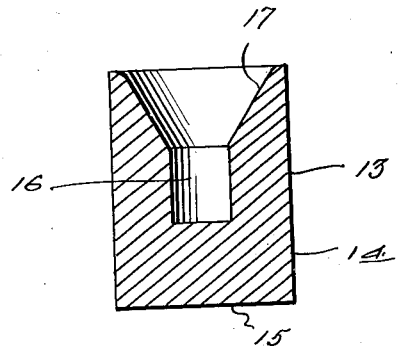
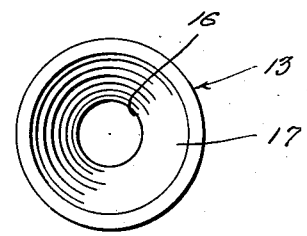
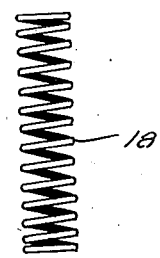
Inventor
J. G. Kubelus
By Clarence A. O'Brien
                    Attorney Sept. 18, 1934.   J. G. KUBELUS   1,974,030
VALVE ACTUATING UNIT
Filed Sept. 27, 1933   2 Sheets-Sheet 2
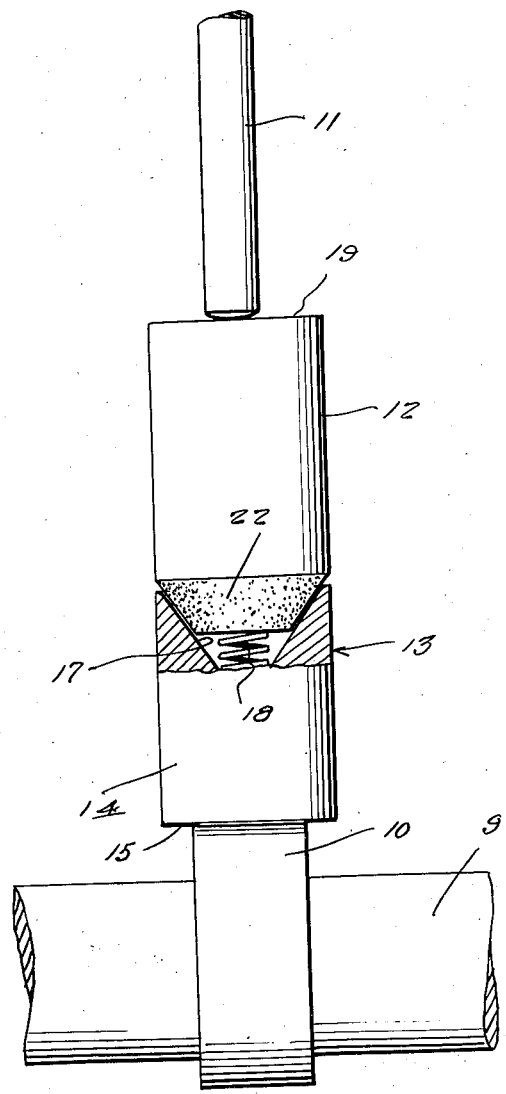
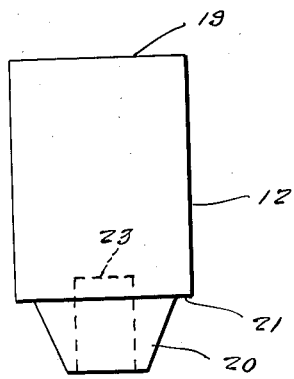
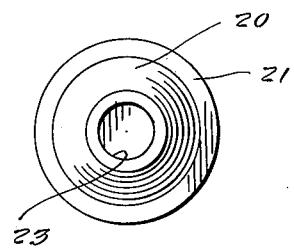
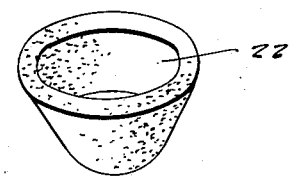
Inventor
J. G. Kubelus
By Clarence A. O'Brien
Attorney Patented Sept. 18, 1934

1,974,030

UNITED STATES PATENT OFFICE 1,974,030

VALVE ACTUATING UNIT

Joseph George Kubelus, Jessup, Pa.

Application September 27, 1933, Serial No. 691,215

1 Claim. (Cl. 123—90)

This invention relates to a novel two-part or duplex actuating unit for use in conjunction with a rotary tappet shaft and valve stem arrangement, such as is used in connection with internal combustion engine valves, for example, mushroom and poppet types of valves.

In the ordinary or conventional arrangement, a device, generally of an adjustable type, is interposed between the valve stem and the cam or tappet shaft. This is sometimes referred to as a plunger, a push rod or the like. The generally accepted construction for a plunger of this form is a one-piece element of general rod-like form whose lower end is fashioned for cooperation with the rotary cam and whose upper end is provided with extensible adjusting means to regulate the gap existing between said upper end and the lower end of the valve stem. Inasmuch as these parts are subject to great wear, the clearance space or gap sometimes gets beyond control, permitting needless lost motion and developing metallic clinking noises.

I have discovered a simple and economical duplex unit which serves as a unique adaptor and which compensates for the inaccuracies generally encountered in that it is of an automatic type and is in constant contact with the cam and valve stem. It follows, therefore, that I have evolved and produced an efficient and novel valve stem actuator calculated to better fulfill the requirements of a device of this class, whereby to promote greater efficiency in engine operations.

Other features and advantages will become more readily apparent from the following description and drawings.

In the drawings:—

Figure 1 is an elevational view of the valve stem, tappet and actuating unit assembly developed in accordance with the principles of the present inventive conception.

Figure 2 is a side view of Figure 1, with parts broken away and shown in section.

Figure 3 is an elevational view of the upper part of the novel actuating unit.

Figure 4 is a sectional view of the companion lower actuation part of said unit.

Figure 5 is a top plan view of Figure 4 appearing in elevation.

Figure 6 is a bottom plan view of Figure 3.

Figure 7 is a detail perspective view of a shock absorbing and noise cushioning facing or collar for the upper part shown in Figure 3.

Figure 8 is a detail view of the type of spring used.

In the drawings, the cam or tappet shaft is denoted by the numeral 9 and the tappet or cam element by the numeral 10. The numeral 11 designates the reciprocatory valve stem. The two-part or duplex unit interposed between the cam 10 and shaft or stem 11 constitutes the novelty of the invention and is referred to as a valve stem actuating device or unit. It is made up of a pair of complemental companion parts, the upper one of which is differentiated by the numeral 12 and the lower one by the numeral 13. Considering first the construction of the lower part 13, it will be observed that this is in the form of a cylindrical member 14 whose bottom 15 is shown as being flat, though it may vary in configuration to accommodate the type of cam with which it cooperates. This part 13 is centrally bored to provide a spring receptive socket 16 and counter bored to provide a conical jointing seat 17. The spring which fits into the socket 16 is differentiated by the numeral 18 in Figure 8.

Considering now the upper part 12, as shown in Figure 3, this comprises a cylindrical section or part having a flat top 19 to accommodate the adjacent lower end of the valve stem 11. The lower end portion of this part 12 is of frusto-conical reduced form and defines what may be distinguished as a frusto-conical extension 20. This is adapted to telescope into the jointing seat 17 to permit the two parts to be properly aligned and mated. The extension 20 is of such proportions as to define an abutment or annular shoulder 21. Moreover, this extension is adapted to be surrounded by a conical facing collar 22 of rubber, fibre or equivalent material. The thickness of this shock absorbing collar 22 is such that it abuts the shoulder 21 nicely and terminates in substantial flush relation thereto so as to leave no projection beyond the surfaces of the part 12. I finally call attention to the numeral 23 which designates a socket to cooperate with the first named socket 16 and to accommodate the upper end portion of the coiled spring 18. The spring 18 is, of course, of lighter tension and strength than the valve stem spring (not shown).

In practice, it is understood that the novel automatic compensating unit is operable in a suitable guide 24, as shown in Figure 1, and that the two parts 12 and 13 are assembled in longitudinal alignment. In other words, the shock absorbing faced extension 20 of the part 12 normally fits telescopically into the seating recess 17 of the part 14. Obviously, when the cam 10 moves to its lifting or thrust position, the coiled spring 18 between these two parts is compressed and the parts come together, or practically so, as shown in the drawings. When the pressure on the part 13 is released by the cam 10, the spring 18 separates the two parts but both parts are constantly maintained in yieldable pressing contact with the cam 10 and valve stem 11 respectively. In other words, there is no air space or gap between the part 12 and valve stem 13, as is ordinarily the case. This takes up lost motion and thus compensates for undesirable noises and wear and tear. It follows, therefore, that the invention is aptly fitted for the purposes intended and is calculated to transcend, in mechanical value, the prior art devices intended to serve somewhat the same compensating results.

It is thought that the description, taken in connection with the drawings, will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

What is claimed is:—

A valve stem actuating device comprising an upper member for engaging a valve stem and a lower member for engaging a cam, the major portions of said members being of solid construction, the lower member having a frusto-conical recess in its upper end, the large part of which opens out through the upper end of the member, with its walls spaced from the exterior wall of the member to provide a shoulder at the upper end of the member which surrounds the recess, and said member having a socket therein leading downwardly from the lower end of the recess with its bottom closed, the upper member having a frusto-conical lower end, the junction of the large end thereof with the major part of the upper member forming a shoulder, said lower end of the upper member having a socket therein opening out through the small end of the frusto-conical part, a spring having its ends seated in said sockets of the two members and a frusto-conical collar of resilient material surrounding the frusto-conical lower end of the upper member with its upper end bearing against the shoulder of the upper member.

JOSEPH GEORGE KUBELUS.